S. S. RIGBY.
TROLLEY WHEEL.
APPLICATION FILED OCT. 24, 1921.

1,401,495.

Patented Dec. 27, 1921.

Inventor
Samuel S. Rigby

By Shepherd Campbell
Attorneys

UNITED STATES PATENT OFFICE.

SAMUEL S. RIGBY, OF NEW CASTLE, PENNSYLVANIA.

TROLLEY-WHEEL.

1,401,495.      Specification of Letters Patent.      Patented Dec. 27, 1921.

Application filed October 24, 1921. Serial No. 509,960.

*To all whom it may concern:*

Be it known that I, SAMUEL S. RIGBY, citizen of Pennsylvania, U. S. A., residing at the city of New Castle, in the county of Lawrence and State of Pennsylvania, have invented certain new and useful Improvements in Trolley-Wheels, of which the following is a specification, reference being had therein to the accompanying drawings.

This invention relates to trolley wheels and harps and it has for its object to provide an improved device of this nature constructed in such manner as to guard against the accidental dislodgment of the trolley structure from the trolley wire.

A further object of the invention is to provide improved means of lubricating the trolley wheels.

Figure 1:
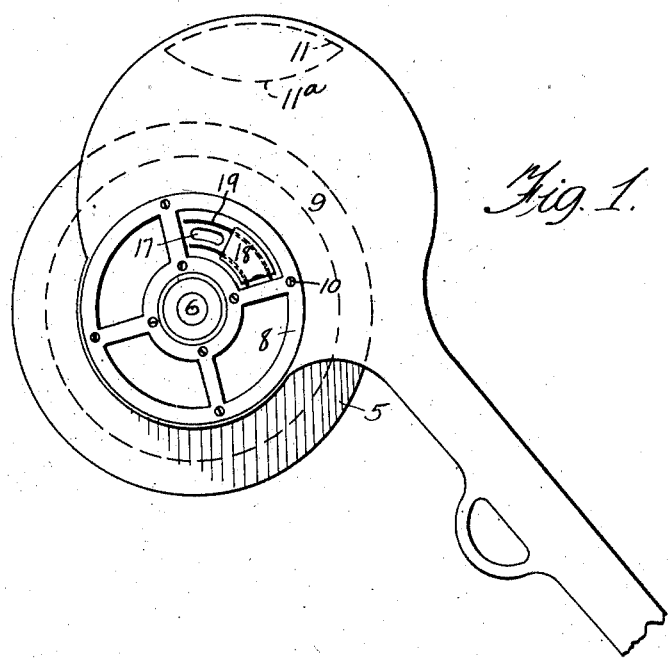
Figure 2:
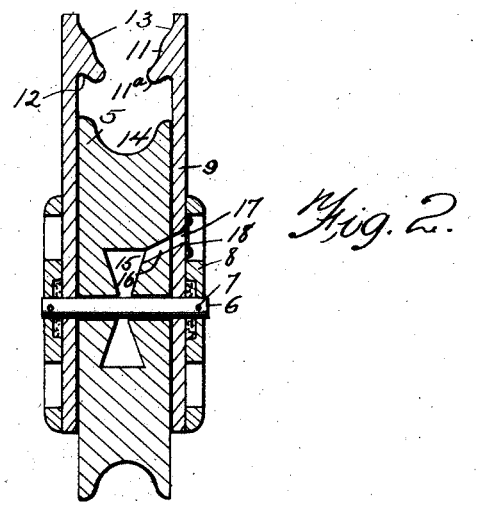

Like numerals designate corresponding parts in the accompanying drawing in which, Figure 1 is a side elevation of the upper part of a trolley harp having a trolley wheel mounted therein; and Fig. 2 is a vertical sectional view therethrough.

In the drawing 5 designates the trolley wheel which is mounted for rotation upon a pin or shaft 6. The ends of the shaft 6 are secured by pins 7 in guard rings 8 of wheel-like formation, these rings being secured to the outer faces of the sides 9 of the trolley harp by screws 10. The sides 9 of the trolley harp are extended to a considerable distance above the top of the trolley wheel, as indicated at 9ª and these extended portions are provided upon their inner faces with downwardly and inwardly directed guards or stops 11 which are of hook-like formation, in that they are undercut, as indicated at 12, to provide positive retaining recesses for the trolley wire, if the wire tends to leave the harp in rounding curves. The upper faces of the guards or stops are inclined, as indicated at 13, and act to guide the trolley wire into the channel 14 of the trolley wheel when placing the trolley upon the wire. By referring to Fig. 1 it will be observed that the lower edges 11ª of the guards or stops 11 are convex and that these guards or stops merge into and are integral with the sides 9 of the harp leaving no abrupt shoulders to catch on the wire or interfere with the proper placing of the trolley upon the wire.

An oil chamber 15 is formed in the interior of the trolley wheel 5 and a filling port 16 leads from this chamber and communicates with a port 17 formed in one of the sides 9. The latter port is adapted to be covered by a sliding gate 18 movable upon guide ribs 19 carried by one of the guard rings 8. Chambers 20 are formed in the guard rings and may, if desired, be provided with packing 21 to prevent the escape of oil outwardly past the ends of the shaft 6 thus aiding in retaining the oil in the chamber 15.

It is to be understood that the invention is not limited to the precise construction set forth but that it includes within its purview whatever changes fairly come within either the terms or the spirit of the appended claims.

Having described my invention what I claim is:

1. A device of the character described comprising a trolley wheel and harp, the sides of the harp being extended above the trolley wheel and being provided upon their inner faces with integral downwardly and inwardly directed hook-like portions having undercut concave lower sides which lie wholly above the trolley wheel.

2. A structure as recited in claim 1 wherein said downwardly and inwardly directed hook-like portions are provided with longitudinally convex lower edges which merge into the side walls of the harp.

3. A structure of the character described comprising a trolley wheel, a harp consisting of side walls which extend above said trolley wheel and guards or stops carried by said sides, and integral and rigid therewith, said guards or stops having inclined upper faces and undercut concave lower faces which lie wholly above the trolley wheel.

4. A structure as recited in claim 3 wherein said guards or stops have longitudinally convex lower edges which merge into the walls of the harp.

In testimony whereof I hereunto affix my signature.

SAMUEL S. RIGBY.